United States Patent [19]
Hasuda et al.

[11] Patent Number: 5,594,521
[45] Date of Patent: Jan. 14, 1997

[54] BRAKE APPARATUS FOR A SHUTTER

[75] Inventors: Masanori Hasuda; Takashi Matsubara, both of Yokohama, Japan

[73] Assignee: Nikon Corporation, Tokyo, Japan

[21] Appl. No.: 457,536

[22] Filed: Jun. 1, 1995

[30] Foreign Application Priority Data

Aug. 24, 1994 [JP] Japan .................................. 6-199870

[51] Int. Cl.$^6$ .................................................. G03B 9/40
[52] U.S. Cl. .................................. 396/453; 396/484
[58] Field of Search ............................. 354/246, 248, 354/249, 250, 252

[56] References Cited

U.S. PATENT DOCUMENTS 4,110,773  8/1978  Scholz .......................... 354/252
4,657,366  4/1987  Tanabe et al. ................. 354/246
4,692,009  9/1987  Toyoda et al. ................. 354/246

Primary Examiner—A. A. Mathews
Attorney, Agent, or Firm—Staas & Halsey

[57] ABSTRACT

In order to provide a durable and strong brake apparatus for a shutter, provision is made of a first shaft, a first brake mechanism rotatably fitted on the first shaft, a second shaft disposed at a predetermined distance from the first shaft, a second brake mechanism rotatably fitted on the second shaft, and a connecting mechanism for connecting the first brake mechanism and the second brake mechanism together and operatively associating them integrally with each other.

10 Claims, 6 Drawing Sheets

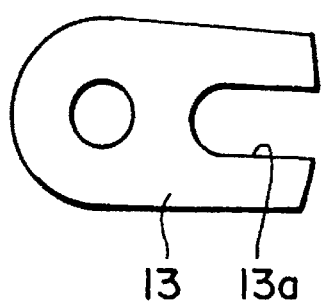
F I G. 5A
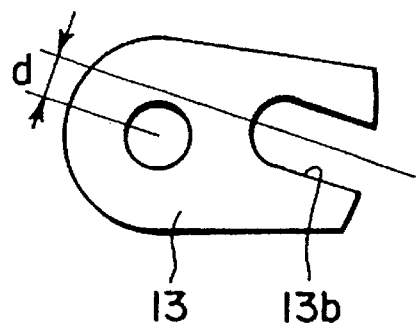
F I G. 5B
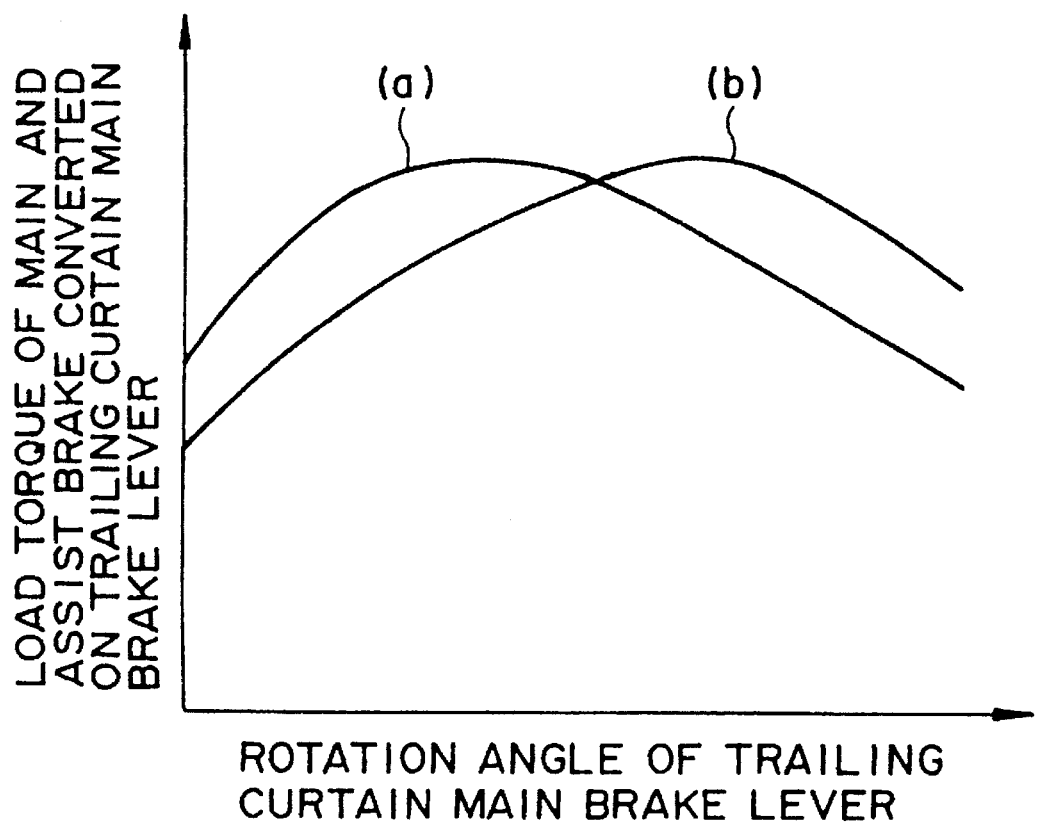
F I G. 6

BRAKE APPARATUS FOR A SHUTTER

BACKGROUND OF THE INVENTION

1. Field of the Invention

This invention relates to a brake apparatus for a shutter for a camera.

2. Related Background Art

A brake apparatus for the shutter blade moving mechanism of a camera according to the prior art is designed such that as shown, for example, in FIG. 7 of Japanese Laid-Open Patent Application No. 61-251830, a brake lever is urged against a washer by the biasing force of a belleville spring, whereby a friction torque is applied. This brake apparatus is also designed such that the pin of the blade moving mechanism bears against the brake lever of the brake apparatus near the end of the blade movement of the blade moving mechanism and a brake is applied to the blade moving mechanism by the friction torque of the brake lever.

In recent years, a requirement for higher speed such as an increase in the maximum shutter time and tuning speed of a shutter has been rising. To satisfy the requirement, it is necessary to increase the movement speed of the blade moving mechanism and as a result, the necessity of securing durability has arisen. In addition, the necessity of strengthening a brake apparatus for stopping the blade moving mechanism has also arisen. However, if as a countermeasure for that, the force of the belleville spring is simply strengthened to thereby increase a friction torque produced, the frictional force between the brake lever and the washer will become great and a mechanical problem such as galling will become more liable to occur in the portion of contact with the belleville spring. This has led to the problem that the durability of the brake itself becomes liable to be spoiled.

SUMMARY OF THE INVENTION

The object of the present invention is to provide a brake apparatus for a shutter which is durable and strong.

According to the present invention, in a brake apparatus for a shutter, it is first problem solving means to have a first shaft, a first brake mechanism including a first brake lever rotatably fitted on said first shaft, a second shaft disposed at a predetermined distance from said first shaft, a second brake mechanism including a second brake lever rotatably fitted on said second shaft, and a connecting mechanism for connecting said first brake mechanism and said second brake mechanism together and operatively associating them integrally with each other.

Also, it is second problem solving means to construct the brake apparatus such that when the distance from said first shaft to the connecting portion of said connecting mechanism is L1 and the distance from said second shaft to the connecting portion of said connecting mechanism is L2, L1>L2, and further, it is third problem solving means to have a connecting member provided on one of said first brake mechanism and said second brake mechanism for changing said L1 and said L2, and it is fourth problem solving means to have an engagement portion engaged with said connecting member for changing the brake characteristic formed on one of said first brake mechanism and said second brake mechanism, and it is fifth problem solving means to give the shock absorbing function to the connecting portion of said connecting mechanism, and it is sixth problem solving means to dispose the first shaft at one side of a line a driving lever shaft for a leading curtain and a driving lever shaft for a trailing curtain and dispose the second shaft at the other side of said line, and it is seventh problem solving means to dispose said first shaft on the exposure opening portion side of a base plate.

According to the present invention, in the brake apparatus for a shutter, provision is made of the first shaft, the first brake mechanism rotatably fitted on the first shaft, the second shaft disposed at a predetermined distance from the first shaft, the second brake mechanism rotatably fitted on the second shaft, and the connecting mechanism for connecting the first brake mechanism and the second brake mechanism together and operatively associating them integrally with each other, whereby the brake mechanism is divided into a plurality and therefore, a brake force produced by a brake can be made small. Also, it becomes possible to increase the brake force without spoiling durability.

Also, the brake apparatus is constructed such that when the distance from the first shaft to the connecting portion of the connecting mechanism is L1 and the distance from the second shaft to the connecting portion of the connecting mechanism is L2, L1>L2 and therefore, a braking force can be obtained more effectively.

Further, the connecting member for changing L1 and L2 is provided on one of the first brake mechanism and the second brake mechanism and therefore, a braking force as required can be obtained.

Also, the engagement portion for changing the brake characteristic is formed on one of the first brake mechanism and the second brake mechanism and therefore, a braking force matching the timing of braking can be obtained.

BRIEF DESCRIPTION OF THE DRAWINGS

FIGS. 5A and 5B show changes in the groove portion of an assist brake piece 13 in an embodiment of the present invention.

FIG. 6 is a graph illustrating the brake characteristic.

DESCRIPTION OF THE PREFERRED EMBODIMENTS

Some embodiments of the present invention will hereinafter be described in detail with reference to the drawings.

Figure 1:
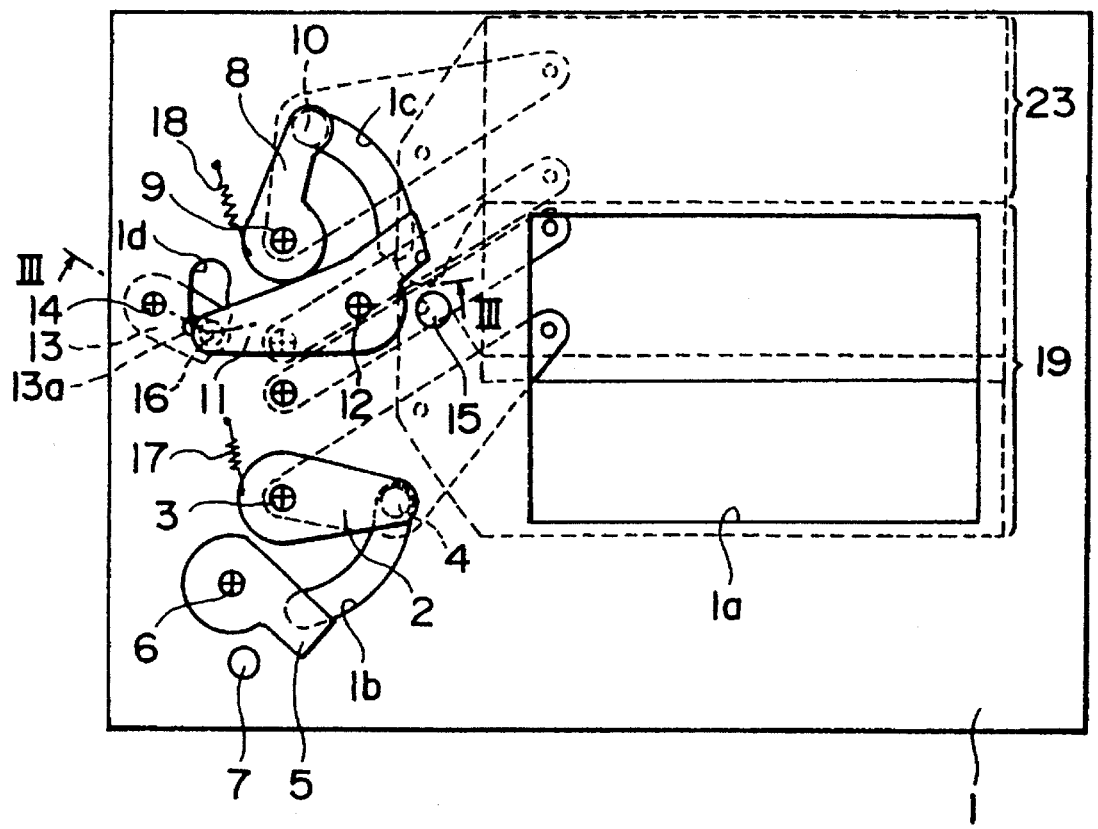
FIG. 1 is a schematic view illustrating an embodiment of the present invention and showing the state thereof before the start of the exposure operation after shutter charge.

FIG. 1 is a schematic view illustrating an embodiment of the present invention and showing the state thereof before the start of the exposure operation after shutter charge.

In FIG. 1, the reference numeral 1 designates a base plate formed with an opening portion 1a for exposure. The reference numeral 2 denotes a leading curtain driving lever fitted on a leading curtain driving lever shaft 3 studded in the base plate 1 and mounted for rotation about the shaft. A leading curtain driving pin 4 is mounted on the tip end of the leading curtain driving lever 2. This leading curtain driving pin 4 extends through a substantially crescent slot 1b formed in the base plate 1, and the operation range of the leading curtain driving pin 4 is regulated by the slot 1b. The reference numeral 5 designates a leading curtain brake lever fitted on a leading curtain brake shaft 6 studded in the base plate 1 and mounted for rotation about the shaft, and a frictional torque is applied thereto by a conventional mechanism comprised of a belleville spring, a friction plate, etc. The leading curtain brake lever 5 is situated at a location whereat it bears against the leading curtain driving pin 4 near the end of the clockwise rotation of the leading curtain driving lever 2, and is designed to apply the brakes to the leading curtain driving lever 2. The reference numeral 7 denotes a leading curtain brake stopper which limits the clockwise rotation of the leading curtain brake lever 5.

The reference numeral 8 denotes a trailing curtain driving lever fitted on a trailing curtain driving lever shaft 9 studded in the base plate 1 and mounted for rotation about the shaft, and a trailing curtain driving pin 10 is mounted on the tip end of the trailing curtain driving lever 8. This trailing curtain driving pin 10 extends through a substantially crescent slot 1c formed in the base plate 1. The operation range of the trailing curtain driving pin 10 on the base plate 1 is regulated by the substantially crescent slot 1c.

The reference numeral 11 designates a trailing curtain main brake lever fitted on a trailing curtain main brake shaft 12 studded in the base plate 1 and mounted for rotation about the shaft, and a friction torque is applied thereto by a conventional mechanism comprised of a belleville spring, a friction plate, etc. The trailing curtain main brake lever 11 is situated at a location whereat it bears against the trailing curtain driving pin 10 near the end of the clockwise rotation of the trailing curtain driving lever 8, and is designed to apply the brakes to the trailing curtain driving lever 8. The reference numeral 15 denotes a trailing curtain brake stopper which limits the clockwise rotation of the trailing curtain main brake lever 11. The reference numeral 13 designates a trailing curtain assist brake lever fitted on a trailing curtain assist brake shaft 14 studded in the base plate 1 and mounted for rotation about the shaft, and this trailing curtain assist brake lever 13 is disposed on the back side of the base plate 1. A groove portion 13a is formed in the trailing curtain assist brake lever 13, and a brake connecting pin 16 mounted on one end of the trailing curtain main brake lever 11 is slidably fitted in the groove portion 13a. Accordingly, the two brake levers are designed to be integrally operated by this connection. The base plate 1 is formed with a slot 1d through which the brake connecting pin 16 extends, and the brake connecting pin 16 is designed to extend through the slot 1d and be engaged with the groove portion 13a. Accordingly, the brake connecting pin 16 has its operation range regulated by the slot 1d. Also, the brake connecting pin 16 is located on the side opposite to the trailing curtain main brake shaft 12 with respect to a line linking the leading curtain driving lever shaft 3 and the trailing curtain driving lever shaft 9 together.

The reference numeral 17 denotes a leading curtain driving spring having one end thereof mounted on the leading curtain driving lever 2 and the other end thereof mounted on the base plate 1, and biasing the leading curtain driving lever 2 clockwisely.

The reference numeral 18 designates a trailing curtain driving spring having one end thereof mounted on the trailing curtain driving lever 8 and the other end thereof mounted on the base plate 1, and biasing the trailing curtain driving lever 8 clockwisely.

The reference numeral 19 denotes a conventional leading curtain mechanism in which a plurality of divided blades are supported by two arms to thereby constitute a four-node link mechanism. This leading curtain mechanism is designed to be connected to the leading curtain driving pin 4 and open and close the opening portion 1a of the base plate 1 in response to the movement of the leading curtain driving lever 2.

The reference numeral 23 designates a conventional trailing curtain mechanism in which, like the leading curtain mechanism 19, a plurality of divided blades are supported by two arms to thereby constitute a four-node link mechanism. This trailing curtain mechanism 23 is designed to be connected to the trailing curtain driving pin 10 and open and close the opening portion 1a of the base plate 1 in response to the movement of the trailing curtain driving lever 8.

The leading curtain driving lever 2 and the trailing curtain driving lever 8 are held in their positions of FIG. 1 by mechanisms, not shown, against the biasing forces of the leading curtain driving spring 17 and the trailing curtain driving spring 18, respectively.

Figure 2:
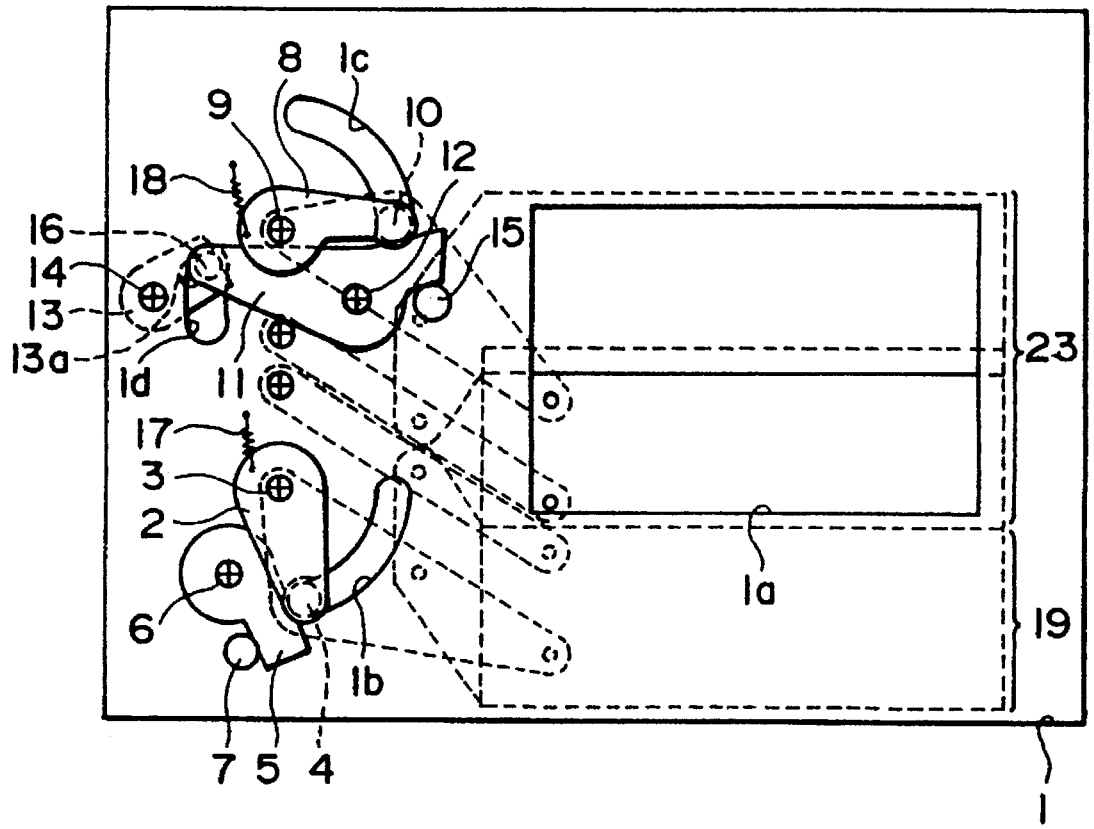
FIG. 2 is a schematic view illustrating an embodiment of the present invention and showing the state thereof when the exposure operation has been terminated.

FIG. 2 shows the state after the termination of the exposure operation of the shutter of FIG. 1.

Figure 3:
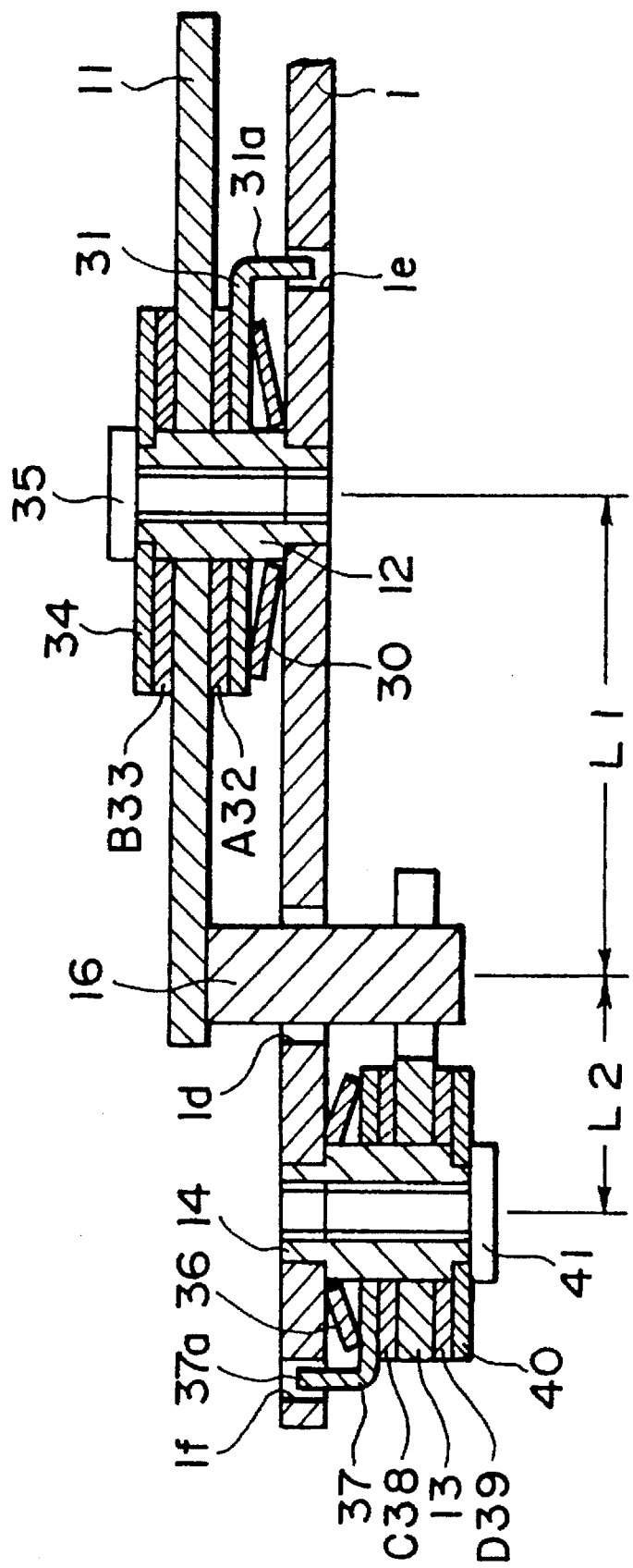
FIG. 3 is a cross-sectional view taken along the line III—III of FIG. 1.

FIG. 3 is a cross-sectional view taken along the line III—III of FIG. 1 and illustrating the trailing curtain brake mechanism in detail. In FIG. 3, the reference numeral 11 designates a trailing curtain main brake lever, the reference numeral 12 denotes a trailing curtain main brake lever shaft, the reference numeral 13 designates a trailing curtain assist brake lever, the reference numeral 14 denotes a trailing curtain assist brake lever shaft, and the reference numeral 16 designates a brake connecting pin.

The trailing curtain main brake mechanism will first be described. A disc-shaped belleville spring 30, a detent 31, a friction plate A32, the trailing curtain main brake lever 11 and a friction plate B33 are inserted in the trailing curtain main brake shaft 12 from the base plate 1 side and further, a keep plate 34 is fixed to the trailing curtain main brake shaft by a set-screw 35. The detent 31 has one end 31a thereof inserted in an aperture 1e formed in the base plate 1 so that it is movable in the axial direction of the trailing curtain main brake shaft 12, but is unrotatable. In this state, the belleville spring 30 flexes from its free state and imparts a force in the axial direction, and the detent 31, the friction plate A32, the trailing curtain main brake lever 11 and the friction plate B33 are urged against the keep plate 34. Accordingly, by frictional forces working between the trailing curtain main brake lever 11 and the friction plates A32, B33, the trailing curtain brake lever 11 can obtain a frictional torque as previously described.

As regards the trailing curtain assist brake mechanism, a disc-shaped belleville spring 36, a detent 37, a friction plate C38, the trailing curtain assist brake lever 13 and a friction plate D39 are likewise inserted in the trailing curtain assist brake shaft 14 from the base plate 1 side and further, a keep plate 40 is fixed to the trailing curtain assist brake shaft 14 by a set-screw 41. The detent 37 has one end 37a thereof inserted in an aperture 1f in the base plate 1 so that it is movable in the axial direction of the trailing curtain assist brake shaft 14, but is unrotatable. In this state, the belleville spring 36 flexes from its free state and imparts a force in the axial direction, and the detent 37, the friction plate C38, the trailing curtain assist brake lever 13 and the friction plate D39 are urged against the keep plate 40. Accordingly, by frictional forces working between the trailing curtain assist brake lever 13 and the friction plates C38, D39, the trailing curtain assist brake lever 13 can obtain a friction torque as previously described.

The material of the friction plates is exclusively PET (polyethylene terephthalate).

The operation of the shutter constructed as described above will now be described.

The holding of the leading curtain driving lever 2 is first released. When the holding is released, the leading curtain driving lever 2 is clockwisely rotated by the biasing force of the leading curtain driving spring 17 (FIG. 1). By this rotation, the leading curtain mechanism 19 opens the opening portion 1a, and exposure is started. Near the end of the rotation of the leading curtain driving lever 2, the leading curtain driving pin 4 bears against the leading curtain brake lever 5. By this bearing, the leading curtain brake lever 5 is clockwisely rotated. By a friction torque created at that time, the brakes are applied to the rotation of the leading curtain driving lever 2. After these series of operations, the rotation of the leading curtain driving lever 2 ends at a position whereat the leading curtain brake lever 5 bears against the leading curtain brake stopper 7.

Next, after the lapse of a predetermined exposure time, the holding of the trailing curtain driving lever 8 is released. When the holding is released, the trailing curtain driving lever 8 is clockwisely rotated by the biasing force of the trailing curtain driving spring 18. By this rotation, the trailing curtain mechanism 23 begins to cover the opening portion 1a. Near the end of the rotation of the trailing curtain driving lever 8, the trailing curtain driving pin 10 bears against the trailing curtain main brake lever 11. By this bearing, the trailing curtain main brake lever 11 is clockwisely rotated. Further, the trailing curtain assist brake lever 13 is counter-clockwisely rotated through the intermediary of the brake connecting pin 16, and by the friction torque of the trailing curtain brake lever 11 created at that time, the brakes are applied to the rotation of the trailing curtain driving lever 8. The rotation of the trailing curtain driving lever 8 ends at a position whereat the trailing curtain main brake lever 11 bears against the trailing curtain brake stopper 15. This state is the state shown in FIG. 2, as previously described.

When the exposure operation ends as described above, the charging operation is performed by a charging mechanism, not shown, and the apparatus returns to the state of FIG. 1.

Turning back to FIG. 3, the trailing curtain brake mechanism will now be described in detail.

When the distance between the trailing curtain main brake shaft 12 and the brake connecting pin 16 is L1 and the distance between the trailing curtain assist brake shaft 14 and the brake connecting pin 16 (this distance varies with the rotation of the trailing curtain brake lever 13, but is to be understood as the average distance) is L2, in the present embodiment, these distances are set to L1>L2. When the frictional torque of the trailing curtain assist brake lever is T2, the torque resulting from it being converted on the trailing curtain main brake lever is $$T2 \times (L1 \div L2)$$

and thus, a frictional torque greater than T2 is obtained. Accordingly, the frictional torque created by the trailing curtain assist brake lever 13 may be small and as a result, it becomes possible to make the brake compact and to make the force created by the belleville spring 36 small to thereby improve the durability of the brake itself.

Also, if as an example, an eccentric pin is used as the brake connecting pin 16 and is mounted on the trailing curtain main brake lever with the distance L1 made changeable, the distances L1 and L2 can be made variable and therefore, the brake force can be made adjustable.

Figure 7:
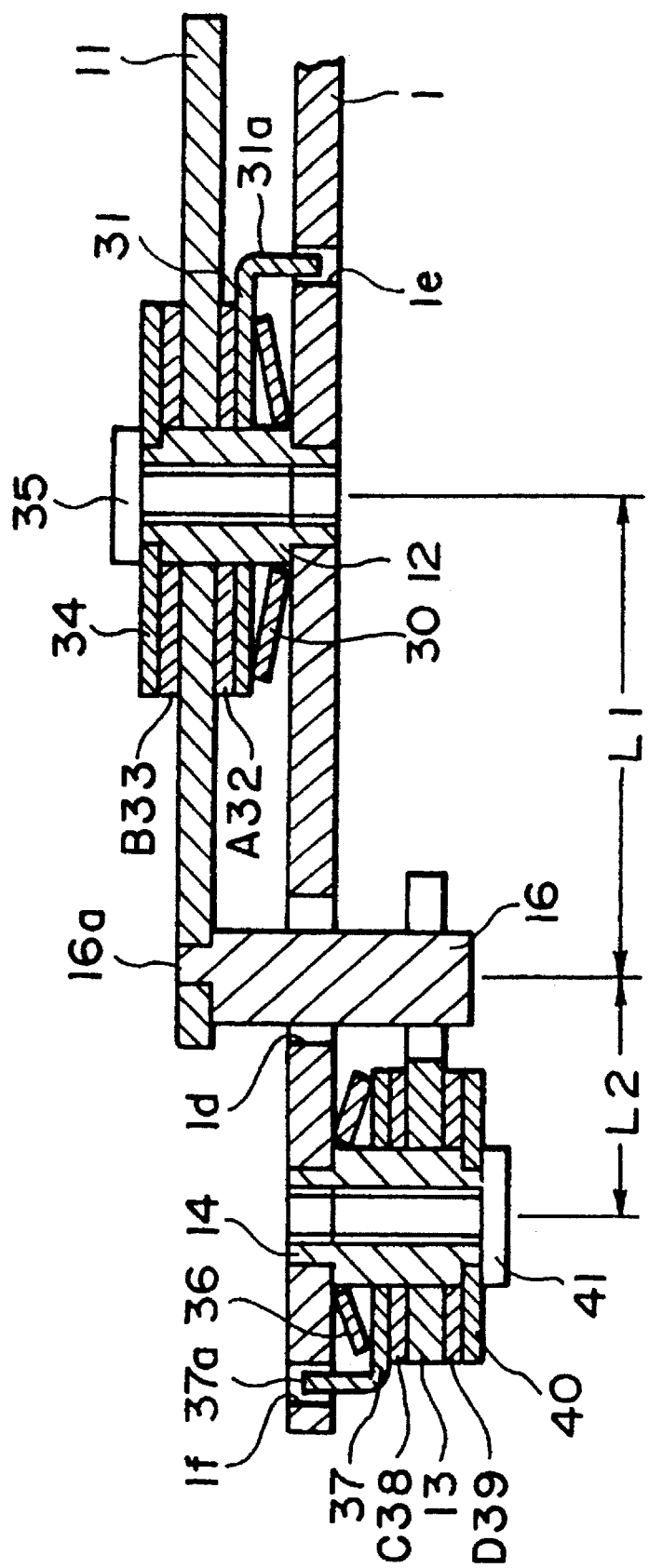
FIG. 7 is a cross-sectional view similar to FIG. 3 but showing another embodiment of the present invention.

FIG. 7 shows an embodiment in which, in contrast with the embodiment of FIG. 3, an eccentric pin is used as the brake connecting pin 16. An eccentric portion 16a is formed on the brake connecting pin 16 relative to the connected portion with the trailing curtain assist brake lever 13, and the eccentric portion 16a is mounted on the trailing curtain main brake lever 11 in such a manner that the brake connecting pin 16 is rotatable. However, the brake connecting pin 16 is mounted in such a manner as to be rotatable from the outside, but to be unrotatable when the brake mechanisms are operated.

If the apparatus is so constructed, the distance L1 is changeable by the brake connecting pin 16 being rotated about the eccentric portion 16a.

Usually, the belleville spring is replaced with another one or the thickness of the friction plate or the detent is varied to thereby vary the force of the belleville spring and adjust the brake force, but in such an adjusting method, the brake must be disassembled and therefore, time and labor are required for the adjustment. However, in the case of the method as described above in which L1 and L2 are adjusted by the use of the eccentric pin, the brake need not be disassembled and therefore, the adjustment of the brake force can be accomplished with ease.

Also, by changing the shape of the groove portion 13a of the trailing curtain assist brake lever 13, the manner in which the brakes are applied, that is, the manner in which the ratio between L1 and L2 is varied as a result of the rotation of the trailing curtain main brake lever 11, can be adjusted.

The substance of this adjustment will hereinafter be described in detail.

FIGS. 5A and 5B show changes in the groove portion of the assist brake piece 13.

The groove portion 13a of FIG. 5A is designed such that the extension of the center line thereof coincides with the center of the trailing curtain assist brake shaft 14, while the groove portion 13b of FIG. 5B is of such structure that the extension of the center line thereof is spaced apart by a distance d from the center of the trailing curtain assist brake shaft 14.

When these two trailing curtain assist brake pieces 13 are incorporated into an embodiment of the present invention to thereby find the brake characteristic thereof, it is such as shown in the graph of FIG. 6. The brake characteristic herein so referred to is the torque necessary for rotating the trailing curtain main brake when the trailing curtain main brake lever is rotated (said torque is the total of the load of the trailing curtain main brake and the load of the trailing curtain assist brake) which has been found for the rotation angle of the trailing curtain main brake lever. As shown in FIG. 6, in the case of the trailing curtain assist brake lever of FIG. 5A, the peak of the load torque appears at an early stage of rotation, and in the case of the trailing curtain assist brake lever of FIG. 5B, the peak of the load torque appears at a late stage of rotation as compared with FIG. 5A. This is because by the formed position of the groove portion 13a being changed, the manner in which the ratio between said L1 and L2 is varied as a result of the rotation of the trailing curtain main brake lever 11 differs. In this manner, the brake characteristic (the manner in which the brakes are applied) can be varied.

The formed position and shape of the groove portion are not limited to those shown in the drawings, but can be variously selected depending on the demand for the brake characteristic. It is also possible to set the shape of the groove portion from a desired brake characteristic as a shutter to thereby provide an optimum brake. Further, in the present embodiment, the trailing curtain assist brake mechanism including the trailing curtain assist brake lever 13 is disposed on the back side of the base plate 1, but alternatively may be disposed on the same side as the trailing curtain main brake lever 11.

Also, the position of the trailing curtain assist brake mechanism on the base plate 1 can be arbitrarily selected, but when it is disposed on the back side of the base plate 1, the position of the present embodiment is preferable because it does not interfere with the leading curtain mechanism 19 and the trailing curtain mechanism 23.

Figure 4:
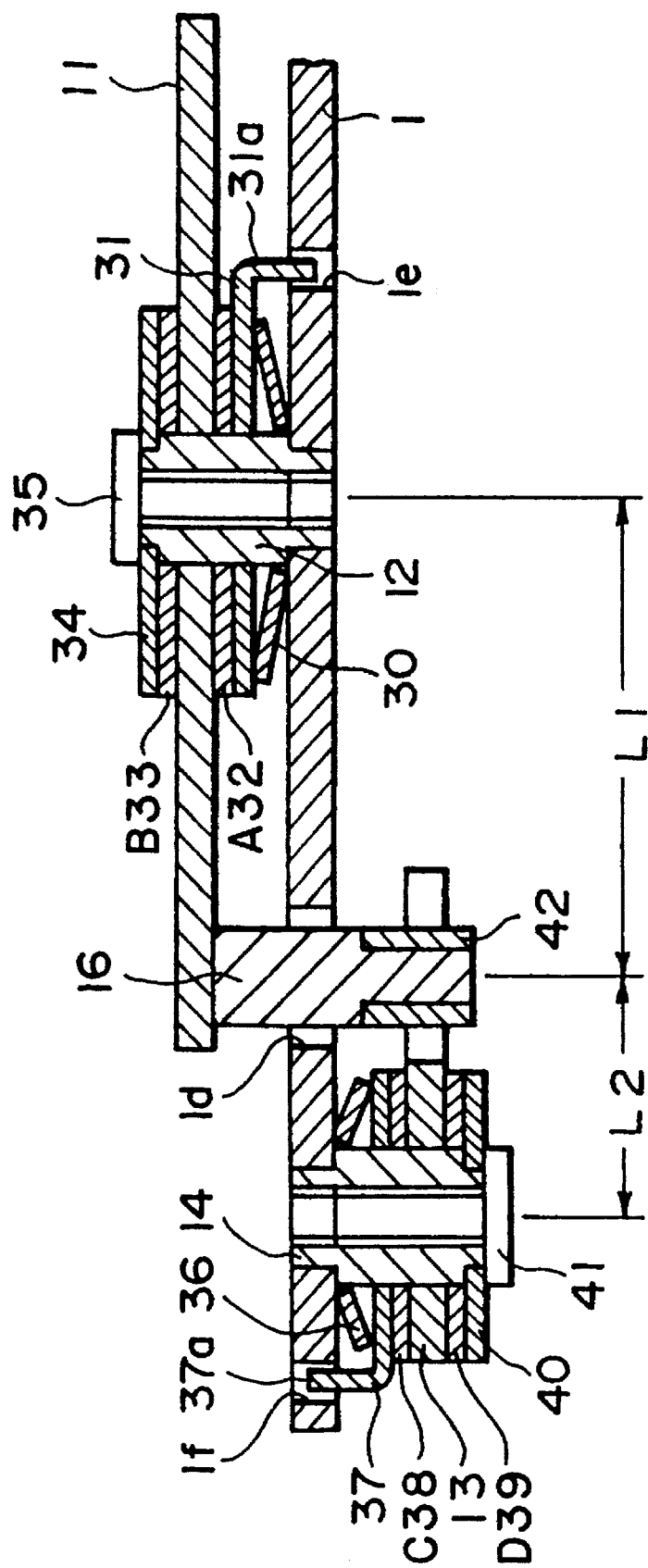
FIG. 4 shows another embodiment of the present invention.

FIG. 4 shows another embodiment of the present invention. The embodiment of FIG. 4 is similar in construction to the embodiment of FIG. 3 with the exception that a shock absorbing member 42 is mounted on a portion of the brake connecting pin 16 which is slidably fitted in the groove portion 13a of the trailing curtain assist brake lever 13. By so constructing, a shock absorbing function can be given to the brake mechanism and the shock of the blade moving system when braked can be alleviated.

The material of the shock absorbing member may be urethane rubber, isoprene rubber, chloroprene rubber, natural rubber, polyurethane elastomer, elastomer of polyester origin, elastomer of olefin origin, elastomer of styrene origin, elastomer of vinyl chloride origin, polyehtylene terephthalate, polybutylene terephthalate, liquid crystal polymer, polyimide, polyether ether ketone, polyether ketone, or compound materials thereof, a fiber reinforcing material or the like.

While the present invention is applied to the brake for the trailing curtain of the shutter, it is of course applicable also to the brake for the leading curtain.

Also, in the embodiments of the present invention, the brake connecting pin 16 is provided on the trailing curtain main brake lever 11 and the groove portion 13a is formed in the trailing curtain assist brake lever 13, whereas this is not restrictive, but a groove portion may be formed in the trailing curtain main brake lever 11 and a brake connecting pin may be provided on the trailing curtain assist brake lever 13.

As described above, according to the present invention, in a brake apparatus for a shutter, provision is made of a first shaft, a first brake mechanism rotatably fitted on the first shaft, a second shaft disposed at a predetermined distance from the first shaft, a second brake mechanism rotatably fitted on the second shaft, and a connecting mechanism for connecting the first brake mechanism and the second brake mechanism together and operatively associating them integrally with each other, thereby dispersing the brake apparatus, and therefore a frictional force is not unreasonably increased by only one brake of the friction type, but a great brake force can be reasonably obtained, and this leads to the effect that the brake force can be improved without the durability of the brake apparatus itself being spoiled.

Also, the brake force and the manner in which the brakes are applied can be adjusted simply by changing the position of the pin in the connecting portion between the main brake and the assist brake and the disposition and shape of the connecting groove, and this also leads to the effect that adjustment can be accomplished without the apparatus being disassembled and an optimum brake force characteristic can be obtained easily.

Further, by adding a shock absorbing mechanism to the connecting portion between the main brake and the assist brake, there can be provided a brake mechanism having a shock absorbing function, and this also leads to the effect that the durability of the shutter can be more improved.

What is claimed is:

1. A brake apparatus for a shutter comprising:

a first brake mechanism including a first shaft, a first brake lever rotatably supported on said first shaft, and a first braking member for braking said first brake lever, said first brake lever being adapted to rotate in response to the operation of said shutter, whereby the braking of said shutter is done;

a second brake mechanism including a second shaft spaced apart by a predetermined distance from said first shaft, a second brake lever rotatably supported on said second shaft, and a second braking member for braking said second brake lever; and a connecting mechanism linking said two mechanisms together so as to operate said second brake mechanism in connection with the operation of said first brake mechanism.

2. The brake apparatus of claim 1, wherein when the distance from said first shaft to the connecting portion of said connecting mechanism is L1 and the distance from said second shaft to the connecting portion of said connecting mechanism is L2, the following relation is established:

$$L1 > L2.$$

3. The brake apparatus of claim 2, further comprising:

a changing member provided on one of said first brake mechanism and said second brake mechanism for changing said distances L1 and L2.

4. The brake apparatus of claim 3, wherein said connecting mechanism comprises a pin provided on the end portion of said first brake lever, and a slit in said second brake lever, and said changing member has an eccentric shaft provided on said pin and engaged with said slit.

5. The brake apparatus of claim 1, further comprising:

an adjusting member provided on one of said first brake mechanisms and said second brake mechanism for adjusting the brake characteristic.

6. The brake apparatus of claim 5, wherein said connecting mechanism comprises a pin provided on the end portion of said first brake lever, and said adjusting member comprises a slit in said second brake lever, the center line of said slit being offset from the axis of said second shaft.

7. The brake apparatus of claim 1, wherein said connecting mechanism has a shock absorbing member interposed between said first brake lever and said second brake lever, and said shock absorbing member alleviates a shock with which said two brake levers contact with each other during operation.

8. The brake apparatus of claim 1, wherein said first shaft and said second shaft are mounted on a base plate, and said first shaft is mounted on a surface opposite to a surface on which said second shaft is mounted.

9. The brake apparatus of claim 8, wherein said second shaft is mounted on the surface on which said first shaft is mounted.

10. The brake apparatus of claim 1, wherein said first shaft is disposed on the opening portion side of a base plate.

* * * * *